April 15, 1947. J. W. KARWEIT 2,418,841
HYDRAULIC DRILL PRESS
Filed Nov. 6, 1943 3 Sheets-Sheet 1

INVENTOR.
John W. Karweit
BY
HIS ATTORNEY

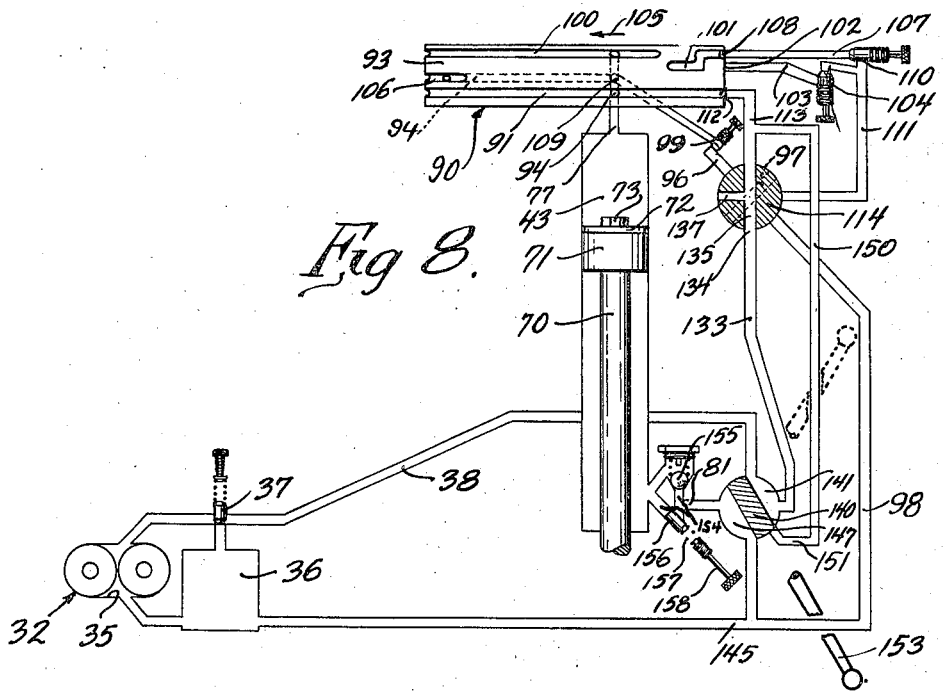
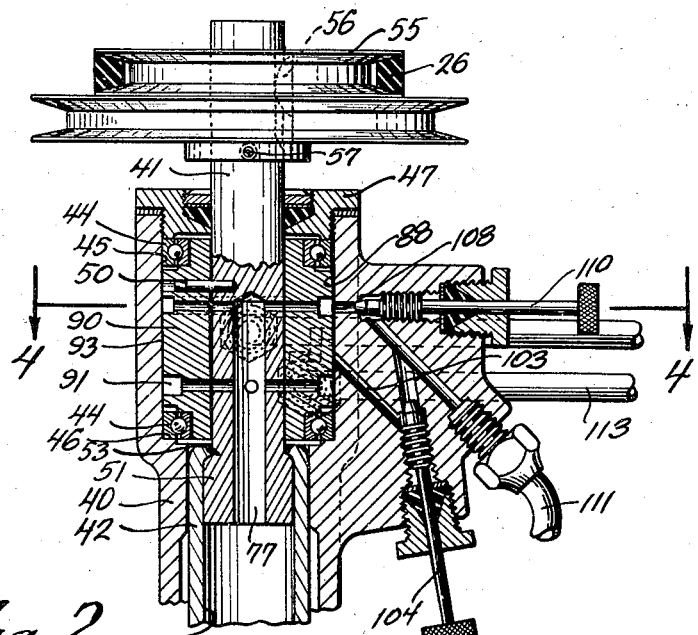

April 15, 1947. J. W. KARWEIT 2,418,841
HYDRAULIC DRILL PRESS
Filed Nov. 6, 1943 3 Sheets-Sheet 3
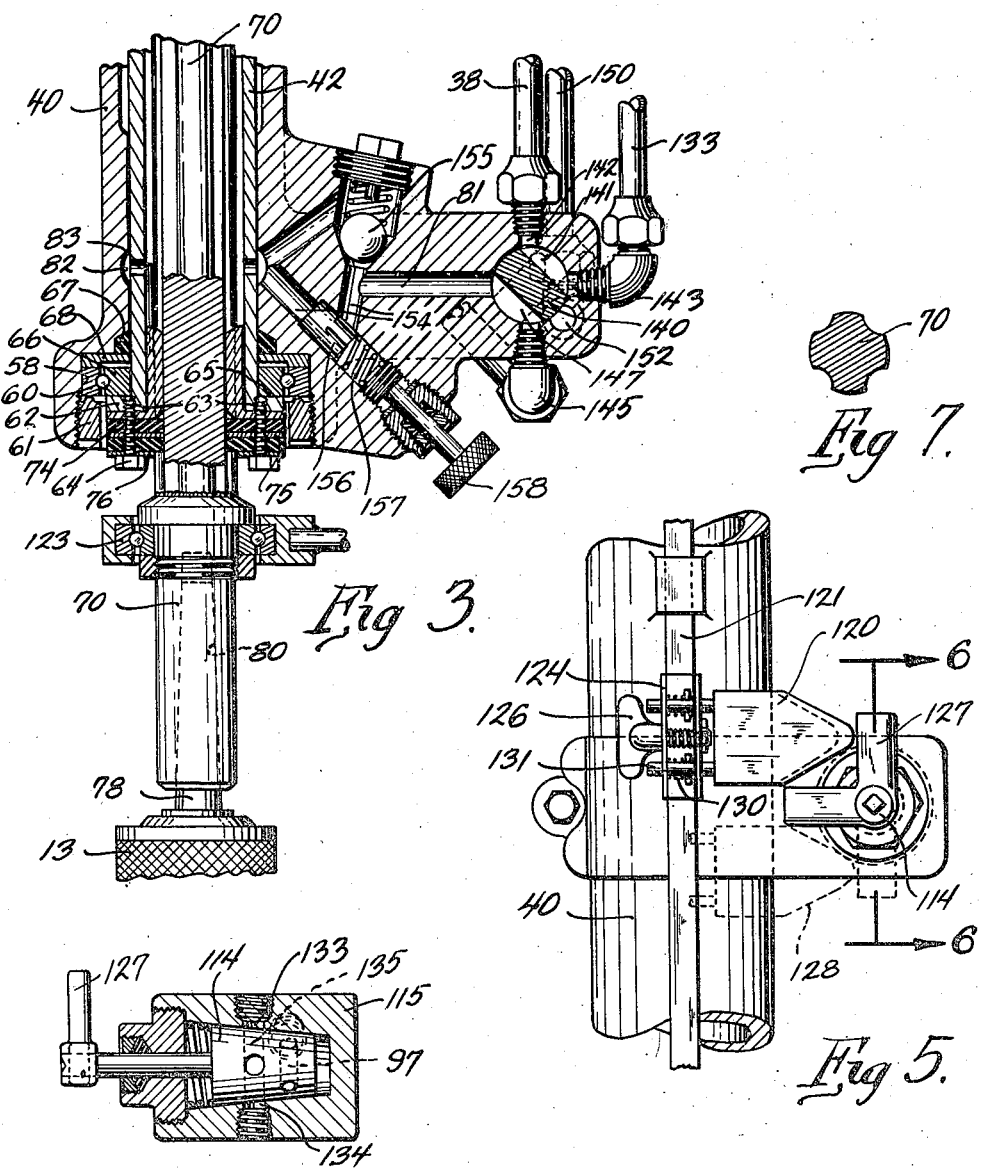
INVENTOR.
John W. Karweit
BY
His Attorney Patented Apr. 15, 1947

2,418,841

UNITED STATES PATENT OFFICE 2,418,841

HYDRAULIC DRILL PRESS

John W. Karweit, Skokie, Ill., assignor, by mesne assignments, to Ex-Cell-O Corporation, Detroit, Mich., a corporation of Michigan Application November 6, 1943, Serial No. 509,233

15 Claims. (Cl. 77—32)

The invention relates to power driven tools and more particularly to drill presses and certain improvements therein adaptable also for use with similar tools. The present application is a continuation-in-part of my application, Serial No. 464,340, filed November 3, 1942.

Aside from questions of expense, it has long been the practice with drill presses or the like to provide a feed arrangement for advancing the drill with which the operator could "feel" the feed. As a general rule, with this arrangement, the operators were so trained that whenever the feed began to feel heavy to them, they would back the drill clear of the work to remove the chips which filled the drill flutes before feeding the drill further.

In some instances, where a drill press was set up to work with one particular metal, and no other metal was to be used, it was possible to dispense with the arrangement for feeling the feed. In fact, one machine drilling only one metal all the time could be automatic. However, where the drill press would be used for a miscellany of work materials, it was necessary that the feel of the drill be provided since, under conventional practices, stringy metals such as copper, aluminum and naval brass would be encountered, i. e. where the material, including many plastics is ductile enough that a shaving cut from the material does not break under the cutting strain imposed upon it by a cutting edge fed into the material. Without the feel of the feed, drill breakage would be very high.

Furthermore, even where the feel of the feed is present in a hand-feed drill press or the like, the tool breakage is high, particularly where the press is operated by inexperienced operators, or where a deep cut is to be made and the operator seeks to establish a favorable production record.

In other instances, as where a work piece, such as a carburetor body, is nearing completion great care must be exercised to safeguard against breakage of tools in the work piece that would scrap the piece. In some instances the final cuts are made by hand. Much time is consumed in performing the operations conventionally, and the danger of drill breakage with deep cuts is always imminent.

In the present invention not only is the prime cause of tool breakage eliminated, namely, the binding of the chips in the drill flutes, as more particularly discussed in my co-pending applications Serial Nos. 455,417 and 484,612, reference to which is hereby made for other and further discussion upon this point, but the present invention also provides an improved drill press or the like, in which the feel of the feed is not essential to the handling of different metals.

A further object of the invention is to provide an improved process and apparatus, which, while the drill is in operation, produces or comminutes at the cutting edges, chips which are of a regulated, substantially uniform size and shape for a given drill size regardless of the material being drilled, and the size of the chips is so regulated as to be small enough to clear the flutes easily, yet large enough and curled sufficiently that chips will not pack in the flutes.

Another object of the invention is to provide a drill which oscillates the drill within the teachings of the invention only when the drill is in its work feed traverse, and also in which the distance of the oscillation can be varied or adjusted during operation.

Another object of the invention is to provide an improved drill press which is less tiring upon the operator mentally and physically to operate, and can be operated successfully by unskilled as well as skilled operators.

A further object of the invention is to provide an improved hand-feed drill press which can be operated manually for special work or semi-automatic for production work.

One of the objects of the present invention is to provide the combination of a rotary drill and a hand forward feed in which the feed traverse effort is a substantially constant factor.

Another object of the invention is to provide an improved drill press which amateurs may use, who are unskilled mechanically, with little fear of drill breakage during deep cuts of a stringy metal or metals and in which the feed traverse effort can be adjusted and maintained constant.

A further object of the invention is to provide a drill press or the like whose feed traverse characteristics may be varied manually or automatically.

A further object of the invention is to provide a feed arrangement for a drill press where the rate of feed can be kept uniform automatically at any one of a plurality of feed rates, depending upon the size of cut being made.

Another object is to provide a drilling process for stringy metals and plastics in which a single feed traverse is limited only by the length of the flutes upon the drill.

Another object of the invention is to provide a device of the class described which is simple in construction and operation, and inexpensive to manufacture and maintain.

These being among the objects of the invention, other and further objects will become apparent from the drawings, the description relating thereto and the appended claims.

Referring now to the drawings:

Fig. 2 is an enlarged vertical section of the upper portion of the drill head shown in Fig. 1;

Fig. 3 is an enlarged vertical section of the lower portion of the drill head shown in Fig. 1;

Fig. 5 is an enlarged side elevation of the rapid forward and feed traverse control;

Fig. 6 is a section taken upon the line 6—6 in Fig. 5;

Fig. 7 is a cross section of the spindle indicating the drive relationship provided between the sleeve and spindle;

Fig. 8 is a diagrammatical view of the hydraulic system employed in the invention.

Figure 1:
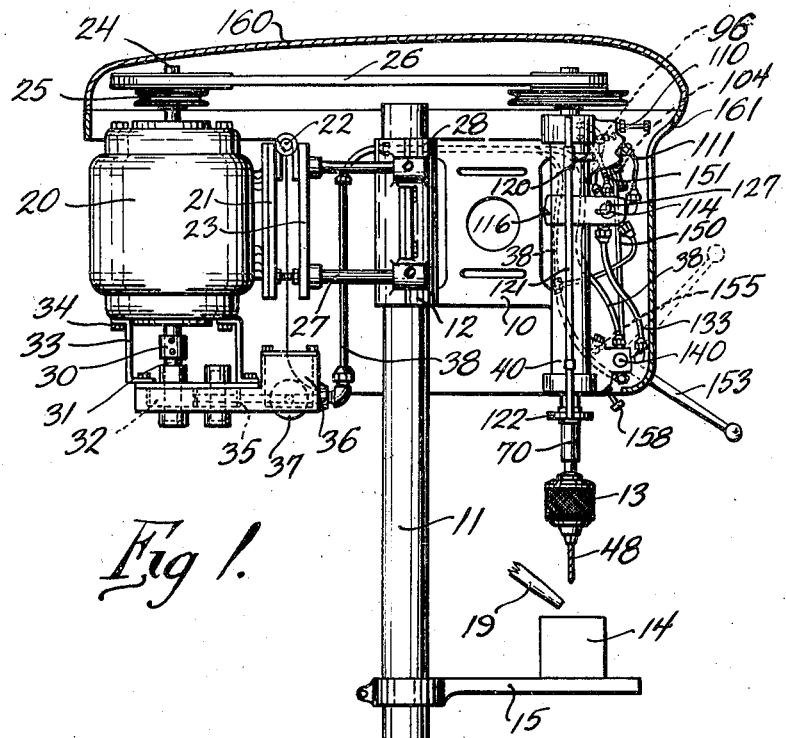
Fig. 1 is a side elevation of a drill press illustrating a preferred embodiment of the invention.
Figure 4:
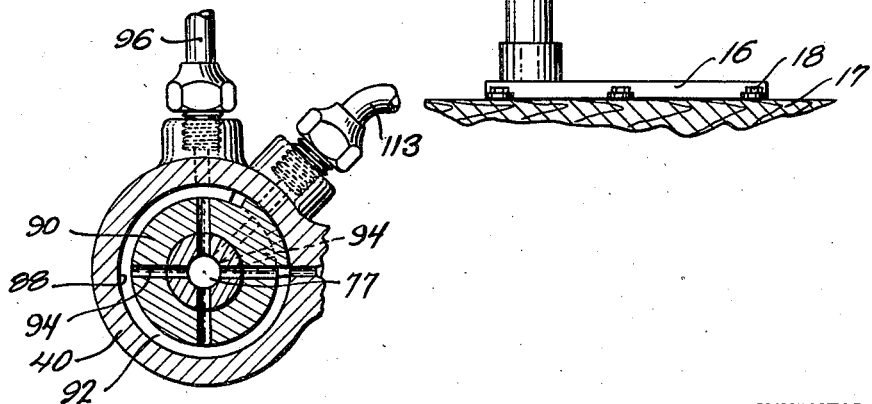
Fig. 4 is a section taken upon the line 4—4 in Fig. 2.

In the practice of the invention, as further described in the co-pending applications referred to, the drill is preferably oscillated repeatedly a distance just enough to terminate or comminute the chips being formed as often as approximately once every relative revolution between the work piece and the drill if the drill has two cutting edges, such as a twist drill. Although the timing of the reciprocation may be varied to occur every second or third revolution if desired, the question of whether or not this is done for any particular application will depend a great deal upon the size of the chip that can be cleared by the flutes considering the metal being machined, and upon the number of cutting edges upon the drill. It is preferred that the cutting edges overlap between oscillations and if the drill has a single cutting edge, the oscillation will preferably occur approximately once every two relative revolutions, at least a revolution plus the fraction of the next revolution which represents the period of the oscillation itself, which oscillation is timed preferably to take no longer than 90 degrees of a rotation and less, if possible, depending upon the inertias of the mass to be moved. The distance of the oscillation is that which will cause the cutting edges to terminate the chip having in mind the additional distance needed to counteract the deflection in the drill press itself when the feed pressure is relaxed.

Referring now to the drawings in further detail, the drill press head 10 is slidably mounted in locked relation upon a standard 11 by means of a split sleeve arrangement 12 so that a drill chuck 13 may be suitably located with respect to a work piece 14 disposed upon the work table 15. Standard 11, in turn, is supported upon a base 16 secured to a floor or table 17 by bolts 18. Means for supplying lubricant or coolant for the drilling operations is shown at 19.

As viewed in Fig. 1, a motor 20 is mounted to the left of the standard 11 upon a base member 21 which is pivoted as at 22 to an adjustable carrier 23. The drive shaft 24 of the motor is preferably disposed vertically and carries a pulley 25 that receives and drives a V belt 26. The carrier 23 is provided with rod supports 27 slidably received in collars 28 by which the tension upon the V belt 26 may be adjusted, and the pivot 22 permits the motor to be pivoted about a horizontal axis to release the belt in event the belt is to be shifted to any other groove upon the pulley 25 than that shown.

The shaft 24 of the motor extends beyond the motor housing at both ends and at its lower end receives a drive coupling 30 by which the drive shaft of a hydraulic pump 32 is driven. The pump 32 is mounted by brackets 33 and bolts 34 to the lower part of the pump casing and comprises a pump compartment 35, a sump 36 and a pressure relief valve 37 by which the hydraulic fluid present in the pressure line 38 is maintained at a constant pressure, the pressure relief valve 37 being adjustably set to relieve the line 38 to the sump above the fluid supply and pressure needed to feed any particular drill into the work piece 14. Upon the right hand side of the support 11 the head 10 is provided with a cored enlargement 40 machined to receive the working parts that will now be described.

Within the cored enlargement 40 a hollow shaft 41 is journalled which carries at the lower end thereof a sleeve 42 (Fig. 3), the inner surface 43 of which constitutes a pressure cylinder. The journalling of the shaft 41 is accomplished by means of a pair of frictionless bearings 44 (Fig. 2), held in place in a suitable bearing cavity 45 against a shoulder 46 by a gland nut 47 threaded into the outer end of the cavity.

The lower end of the shaft 41 has an enlargement 51 thereon received within the upper end of the sleeve 42. The upper rim of the sleeve 42 is upset as at 52 around the inner shoulder of the head 51 where it is brazed as at 53 to the reduced portion of the shaft 41 beyond the head 51 to provide a shoulder against which rests the inner race of the lower one of the two bearings 44. With this arrangement upward thrusts exerted by the sleeve 42 are borne by the gland nut 47 and a driven pulley 55 is secured to the shaft 41 where it extends above the gland nut 47 by means of a Woodruff key 56 and a set screw 57.

At its lower end the sleeve 42 is journalled in the bearing cavity 58 by means of a frictionless bearing 60 held in place by a bearing retainer 61 threaded into the lower end of the enlargement 40. The lower end of the member 42 is flanged outwardly as at 62 and tapped longitudinally as at 63 to receive the ends of the bolts 64. The included shoulder 65 of the flange rests against the inner race 66 of the bearing 60 and a seal 67 is disposed between the enlargement 40 and the sleeve 42 as held in place by a gland washer 68 assembled ahead of the outer race of the bearing 60.

A driven shaft 70 having a splined outer face, as sectionally shown in Fig. 7, is received in the cylinder 43 of the sleeve 42 where it is supported at the upper end by a piston head 71 having a seal 72 on the top thereof held in place by a bolt 73. The rotary drive between the sleeve 42 and the shaft 70 is accomplished at the lower end of the sleeve 42 by means of splined female runner 74 for the shaft 70 locked in place by the bolts 64 with alternate washers 75 and seals 76 held in place around and in the splines of the shaft 70 where the shaft 70 extends beyond the runner 74.

With this arrangement, whenever a hydraulic fluid under pressure is supplied to the cylinder 43 through a bore 77 provided for that purpose longitudinally through the shaft 41, the shaft 70 is forced downwardly to provide a forward or feed traverse for the chuck 13 that is supported conventionally on the lower end of the shaft 70 by means of a shank 78 received in a taper 80. Reverse or return traverse of the shaft 70 is accomplished by applying a counter hydraulic fluid pressure to the cylinder 43 below the head 71 as by a passageway 81 drilled through the enlargement 40 of the head 10 to a recess 82 in the inner wall from whence the fluid reaches the interior of the sleeve 42 through perforations 83 provided in the side wall thereof where they register with the groove 82.

With the description thus far, it will be understood how the drill chuck 13 and a drill 48, carried thereby, is rotated by the motor 20 through the belt 26 and raised and lowered bodily by means of alternately applying the hydraulic fluid pressure developed by the pump 32 above and below the piston 71 in the cylinder 43.

The control of the piston will now be described:

Referring to Fig. 2, the shaft 41 receives a rotary cylindrical valve member 90 thereon between the bearings 44 where the head is enlarged to provide a cylindrical valve compartment 88. The valve member is secured to the shaft by means of a pin 50 which, if desired, can extend clear through the valve member for ease in assembly. Passages in the valve member open upon the cylindrical surface to cooperate with valve ports opening upon the inner face of the valve compartment as will now be described.

As laid out flat in Fig. 8, the surface of the valve member is provided with three circumferentially disposed grooves axially spaced from each other. The grooves are in communication with the cylinder 43 through bores 94 opening into the bore 77. The upper groove 92 extends for approximately 300° of the circumference in one plane as at 100 and angles downwardly to another plane where it extends in a spur 101, approximately 30° of the remaining 60°. The long portion 100 registers with a port 108 upon the compartment wall and the spur 101 registers with a port 102 upon the compartment wall.

Through the valve housing 95 a passageway 107 is drilled to open upon the face 93 at the port 108 which registers with the groove 92 in the rotary member. The flow of hydraulic fluid through the passageway 107 is controlled by means of a needle valve 110 as supplied with hydraulic fluid under pressure from the line 111. With this arrangement of the groove 92 and port 108, the supply of hydraulic fluid to the cylinder 43 is intermittent in quantities controlled by the needle valve 110. More specifically, each time the chuck and drill 13 revolves the groove 92 and port 108 are in communication with each other throughout approximately 300° of the rotation, and out of communication with each other throughout the remaining portion of relative rotation. Hydraulic fluid is supplied to the chamber 43 in quantities metered by the needle valve 110 during the time the groove 92 and port 108 are in communication with each other, and this supply is interrupted when the groove 92 and port 108 are moved to relative positions out of communication with each other. With this control, the drill 48 is intermittently fed into the work to cut some metal for the work in a series of successively identical steps timed in relationship to the rotation of the drill in the work.

Through the valve housing 95 a passageway 103 is drilled to open upon the face 93 at the port 102 which registers with the spur 101. The flow of hydraulic fluid through the passage 103 is controlled by means of a needle valve 104 as supplied with hydraulic fluid under pressure from the line 111. With this arrangement of the spur 101 and port 102, the supply of hydraulic fluid under pressure to the cylinder 43 is intermittent in quantities controlled by the needle valve 104. More specifically, each time the chuck 13 and drill 48 revolve, the spur 101 and port 102 are in communication with each other for approximately 30° of rotation before the groove 92 and port 108 are brought into communication, the direction of rotation of the valve being indicated by the arrow 105.

A second groove is indicated at 91 extending the full 360° of the valve. Hydraulic fluid under pressure may also be supplied to the cylinder 43 above the head 71 through the groove 91 which is in continuous registration with an opening 112 to receive fluid from the line 113. In this way, by selecting which of the two conduits 111 or 113 is to supply hydraulic fluid to the cylinder 43, the piston 71 may be alternatively subjected to a metered intermittent flow or an uninterrupted flow. This selection is made by means of a valve 114 located in a valve housing 115 fastened to the head 10 as by a split collar 116 and a bolt 117.

A third groove 106, located below and in a plane separate from the groove 100, 101 communicates with a port 109 for approximately 30° of rotation of the valve and during the time that the groove 92 is out of communication with the ports 102 and 108. The port 109 is in communication with a conduit 96 leading to the valve 114 when the conduit 96 is placed in communication with the sump 36, passageway 97 in the valve 114, and the pipe 98. Thus, for approximately 30° of rotation, the cylinder 43 is in communication with the sump.

It is preferred that the valve 114 be controlled automatically and adjustably in relationship to the position of the piston 71 in the cylinder 43, the valve being disposed to provide an uninterrupted flow to the cylinder 43 to provide a rapid forward traverse until the feed traverse station is reached, at which time the intermittent metered supplies of hydraulic liquid is substituted to provide the feed traverse discussed, and the conduit 96 placed in communication with the sump through the valve passage 97.

It might be mentioned at this time that during the work feed of the drill, the third groove permits retraction of the piston to be had during 30° of each revolution, as controlled by the valve 99 to terminate a chip being formed, the metering valve 104 provides a brief heavy supply of hydraulic fluid to recover the retraction permitted to the piston and for the remaining 300°, the piston is forward fed at a feed traverse to start and cut another chip from the work piece.

The transition from the rapid forward traverse to the feed traverse for the purposes discussed is accomplished by means of a dog 120 adjustably mounted upon a shaft 121 carried by a frictionless bearing 123. The dog 120 is mounted upon the shaft 121 for vertical adjustment by means of a slider 124 which can be clamped in place by a winged nut 126.

For purposes of actuating the valve by vertical movement of the dog 120 an L-shaped arm 127 is mounted upon the outer end of the valve 114 with one of the arms being engaged by and moved by the dog 120 when the dog moves downwardly to the position shown in phantom 128, and the other of the arms being engaged by the dog 120 when the dog is moved from its position 128 to its full line position as shown in Fig. 5.

As the dog 120 moves downwardly, it yields inwardly, supported by springs 130, to the degree necessary to clear with close contact the arm 127. Pins 131 are provided to support the dog 120 in sliding relationship with respect to the follower 124 to provide for the yield described.

In the position of the valve shown in Fig. 8 the valve is the same as that shown in Fig. 5 wherein the port 132 leading to the line 113 is in communication through the valve passageway 135 with a fluid supply line 133 and its port 134 and conduits 96, 98 are closed. In this position the piston 71 is moved downwardly by a constant and uninterrupted supply of hydraulic fluid under pressure in the supply line 133 until such time as the dog 120 contacts the arm 127 to move the valve to its alternative position in which passageway 97 opens communication between conduits 96 and 98, and, the valve port 136, communicating with the line 111, is placed in communication with the passageway 135 and the port 134 through the T passage 137 in the valve 114. In this position the piston 71 is subjected to the intermittent metered feed provided when the cylinder 43 is connected to the line 111, as described.

The operator controls the supply of hydraulic fluid to the conduit 133 by means of a two-position valve 140. As more particularly shown in Fig. 3, the pressure line 38 is placed in communication with the supply line 133 through a slot 141 cut in one side of the valve 140 where it will register with the ports 142 and 143 for the lines 38 and 133, respectively.

The line leading back to the sump 36 is indicated at 145 and in the position of the valve shown in Fig. 3 the space in the cylinder 43 below the piston 71 is placed in communication with the sump line 145 through the port 146 by means of a slot 147 upon the other side of the valve which establishes communication between the lines 81 and 145.

Between the line 81 and the cylinder ports 82 and 83 is located a bifurcated passage 154 in one branch of which is a check valve 155 opening inwardly to admit flow of hydraulic fluid into the cylinder 43. In the other branch a piston relief valve 156 is mounted opening with the flow of hydraulic fluid from the cylinder 43 as controlled by a heavy spring 157 adjusted as to tension by the adjusting nut 158.

Retraction of the piston 71 is accomplished by the piston valve 156 which yields to release hydraulic fluid from the cylinder under the superior pressure provided above the piston during 330° of the rotation. Then when the ports 109 and 106 register to place the cylinder 43 in communication with the sump 36, the piston valve 156 closes and under the urge of the spring forces some of the hydraulic fluid ahead of it back into the cylinder 43 as a counterforce below the valve 71 to the extent permitted by the valve 99 after which the retraction of the piston thus induced is recovered by the extra supply of hydraulic fluid provided immediately thereafter through the metering valve 104.

Furthermore, the back pressure effect of the piston valve 156 has a steadying effect upon the system.

After the rapid forward traverse has been accomplished and the feed traverse allowed to proceed until the drill cuts to the distance desired, the valve 140 is rotated counter-clockwise to the position shown in phantom 148 in which the port 142 of the pressure line 38 is placed in communication with the cylinder below the piston through the line 81 to force the piston upwardly and provide a rapid reverse traverse for the drill, and the cylinder 43 above the piston 71 is drained back to the sump by the port 143 and the supply line 133 being placed in communication with the port 146 leading to the sump line 145.

However, since upon the reverse stroke of the piston 71 the cylinder 43 above the piston is still in communication with the supply line 133 through the needle valve 110, I provide a by-pass for the valve 114 in the form of a conduit 150 connected to the conduit 113 by means of a T fitting 151. The other end of the conduit 150 is adapted to be placed in open communication with the sump line 145 through a bore 152 cooperating for that purpose with the valve slot 141.

The position of the valve 140 is determined selectively by the operator by means of a handle 153, the construction and the movement of the handle being so correlated that forward traverse and oscillation feed movement of the drill is established when the handle is moved downward, and the reverse traverse of the drill is accomplished when the handle is moved upwardly. The valve 140 closes the bore 152 when the handle is in its down position, thereby permitting the valve 114 to function in the manner described.

The valve 114 and dog 120 are further constructed and arranged so that when it is desirable to feed the drill or some other tool into the work without benefit of the metered intermittent supply of fluid, it can be done by the dog 120 being removed from a position actuating the valve 114. Manipulation of the handle 153 is then relied upon to regulate or meter the fluid supply through the port 143 to the supply line 133 and the line 113. In this way, the device not only can be used to drill with a chip breaking action, but also can be used as any other standard drill.

On the other hand, by incorporating another dog 120 upon the shaft 121 to actuate the valve 140 at the lower limit of the feed, the drill press can be made to operate fully automatically after a forward traverse is initiated. With this arrangement (not shown) the second dog 120 would move the valve 140 from its forward traverse position, as shown in Fig. 3, to its alternate reverse position, shown in phantom 148, it being understood that suitable feed limit stops could be provided or arranged to determine the depth to which the drill is fed into the work 14.

*Operation*

Presupposing that the motor 20 is rotating with the handle 153 disposed in its upper position, a pressure is built up in the pressure line 38 to the degree determined by the relief valve 37 and hydraulic pressure is applied to the cylinder 43 below the piston 71, where the drill 48 and drill chuck 13 are held at their upper or retracted limit. Then, when the handle 153 is moved to its downward position, pressure in the line 38 is supplied in full measure to the cylinder 43 through the supply line 133, valve conduit 135, and groove 91 to provide a rapid forward traverse for the drill 48 until the dog 120 contacts the arm 127 and moves the valve 114 to its alternate position in which the fluid supplied by the supply line 133 is applied through the conduit 111 to the cylinder 32 as metered by the needle valve 110 and interrupter valve 90. In event the drill 48 is of small diameter the metering valve 110 is adjusted to a minimum flow, whereas if the drill in the chuck 13 is of large diameter the valve 110 is adjusted to a greater flow, the valve being operated by a handle assembled through a suitable opening 161 in the casing 160 employed to shield the parts from damage.

During the remainder of the feed traverse, the valve 90 subjects the piston to periodic oscillation in which the piston is fed forward for 300° by hydraulic fluid supplied by the feed traverse valve 110, then retracted for 30° by the piston valve 156 when the valve ports 108 and 109 register and are in communication with the sump, and retracted distance recovered by extra hydraulic fluid supplied through the recovery valve 104.

This distance of retraction is governed by the valve 99 in the conduit sump line 96 and the recovery of the retraction is controlled by the recovery valve 104. During retraction, the chips being formed are terminated and with a series of oscillations accomplished as described, the chips are cut to uniform size small enough to clear the flutes easily, yet large enough as not to pack in the flutes. During the feed traverse cooling lubricant is supplied to the drill and work piece to keep the drill cool as described in my copending applications.

After the piston 71 has been fed forward to carry the drill to the proper depth, the handle 153 is raised manually or automatically to its upper position, at which time the cylinder 43 above the piston is placed in communication with the sump through the conduit 113 and by-pass 150. Fluid under pressure is supplied below the piston 71 through the conduit 81 to force the piston upwardly.

The reverse traverse will be faster than the rapid forward traverse since the displacement of the piston 71 is greater for the same amount of fluid below the piston as compared with the same amount of fluid above the piston, the piston in other words constituting a differential arrangement.

Whenever the valve 114 is left in the position shown in Fig. 8 and Fig. 2, as by removing the dog 120 from a position actuating the arm 127, the feed movement of the drill is controlled by the handle 153, same being a smooth forward feed and a smooth reverse traverse, the speed of which is regulated by the degree of communication permitted by the valve 140 between the respective ports in relationship to the position of the handle.

In event a drill is used having a single cutting edge, it is desirable to rotate the work piece against the drill at approximately the same speed as the drill so that the cuts of the drill overlap between oscillations, thereby removing the material left by a preceding cut before leaving material again at the next oscillation.

Having thus described the invention, the manner in which the objects are accomplished will be understood more clearly when it is noted that with the present invention, regardless of the metal being cut by the drill, all the chips come out a uniform size, a size that can be determined by the length of the arcuate ports 92 and 92a, and the degree of feed permitted to exist by the adjustment of the valve 110, it being possible with this arrangement to provide chips small enough to readily clear the flutes in the drill and be handled thereafter in much the same manner that one would handle sand, as distinguished from long curls and stringy chips that would otherwise bind in the drill and cause drill breakage.

Consequently, although certain embodiments of the invention have been shown and described therein, it will be apparent to those skilled in the art that other and various modifications of the invention may be made without departing from the spirit of the invention, the scope of which is commensurate with the appended claims.

What is claimed is:

1. In a power driven drill press the combination of rotary drive and driven members, a cylinder connected to one of the members, a piston connected to the other member and located in the cylinder, means upon the driven member for receiving a drill in working position to drill a work piece, means for supplying hydraulic fluid to said cylinder upon one side of the piston to feed traverse the driven member and drill with respect to the work piece including a valve relaxing the flow of hydraulic fluid momentarily once each approximate revolution, and means for supplying hydraulic fluid under pressure to the cylinder upon the other side of the piston during the time when said flow is relaxed.

2. In a power driven drill press the combination of rotary drive and driven members, a cylinder connected to one of the members, a piston connected to the other member and located in the cylinder, means upon the driven member for receiving a drill in working position to drill a work piece, means for supplying hydraulic fluid to said cylinder upon one side of the piston to feed traverse the driven member and drill with respect to the work piece including a valve relaxing the flow of hydraulic fluid momentarily once each approximate revolution, means for supplying hydraulic fluid under pressure to the cylinder upon the other side of the piston during the time when said flow is relaxed, to retract the drill a distance sufficient to terminate the chip being formed by the drill, and means for supplying to said one side of the cylinder sufficient fluid for the piston and drill to recover the distance retracted between the time the flow is first relaxed and the feed traverse is again resumed.

3. In a power driven drill press the combination of rotary drive and driven members, a cylinder connected to one of the members, a piston connected to the other member and located in the cylinder, means upon the driven member for receiving a drill in position to drill a work piece, means for rapid forward traversing the driven member and drill to a predetermined position away from a resting position, means for supplying hydraulic fluid to said cylinder upon one side of the piston to feed traverse the driven member and drill with respect to the work piece from said predetermined position including a valve relaxing the flow of hydraulic fluid momentarily once each approximate revolution, and means for supplying hydraulic fluid under pressure to the cylinder upon the other side of the piston whenever said flow is relaxed to lift the drill enough to terminate the chip formed by the drill thereto.

4. In a power driven drill press the combination of rotary drive and driven members, a cylinder connected to one of the members, a piston connected to the other member and located in the cylinder, means upon the driven member for supporting a drill in working position, a valve means driven by one of said members having a first pair of ports in register during the major portion of each revolution of the drill, a second pair of ports brought into register with each other during a portion of each revolution following said major portion, a third pair of ports brought in register during the remaining portion of each revolution, said first pair of ports placing the cylinder in communication upon one side of the piston with a source of metered hydraulic fluid under pressure, the second pair of ports placing the cylinder in communication upon the same side of the piston with a fluid pressure relieving conduit, the third pair of ports placing the cylinder in communication upon the same side of the piston with a source of hydraulic fluid under pressure having a flow characteristic greater than the first source, and means for applying fluid under pressure to the cylinder upon the other side of the piston when said second pair of ports are in register.

5. In a power driven drill press having a head and work support, the combination of a plurality of axially aligned elements, means for reciprocating said elements with respect to each other including a cylinder connected to one element and a piston connected to the other element and disposed in the cylinder, means for rotating one of the elements, means for supporting a machine tool drill having a cutting edge thereon, means for introducing fluid under pressure into said cylinder for traversing said element and drill at a feed traverse including a device intermittently interrupting the supply of fluid under pressure after the cut of the cutting edge overlaps the point where the cut was begun, and means for oscillating said one element and supported drill with a reverse traverse within a minor portion of a revolution a distance just enough for the cutting edge to terminate the chip being formed during each interruption of said supply of fluid under pressure.

6. In a device of the class described for machining a work piece, a housing, a drive shaft, and a driven shaft, said driven shaft comprising two members journalled in the housing and movable axially with respect to each other, a hydraulic element for moving said two members axially with respect to each other to provide a feed traverse, and means controlled by one of said members for controlling said element to retract said members momentarily in stepped relationship with the rotation of said members during rotation, and a drill carried by one of said members for drilling a work piece, said retraction lifting the drill to comminute the chips formed by the drill.

7. A drill press having a head and a work table, a plurality of axially aligned shafts, means for moving said shafts longitudinally with respect to each other including a cylinder upon one shaft and a piston carried by the other shaft disposed in the cylinder, means for rotating the shafts simultaneously, means for mounting a drill on one of the shafts, means for introducing fluid under pressure into said cylinder for moving one shaft longitudinally with respect to the other, and means countering said fluid under pressure for reciprocating said shafts in a reverse direction momentarily within a minor portion of a revolution to comminute at the cutting edge of the drill the chips formed by the drill.

8. A drill press having a head and a work table, a plurality of axially aligned shafts, means for moving said shafts longitudinally with respect to each other including a cylinder upon one shaft and a piston carried by the other shaft disposed in the cylinder, means for rotating the shafts simultaneously, means for mounting a drill on one of the shafts, means for introducing fluid under pressure into said cylinder for longitudinally moving one shaft with respect to the other, and means countering said fluid under pressure for reciprocating said shafts in a reverse direction momentarily once approximately every one to three revolutions of the drill to comminute at the cutting edge of the drill the chips formed by the drill.

9. A drill press having a head and a work table, a plurality of axially aligned shafts, means for moving said shafts longitudinally with respect to each other including a cylinder upon one shaft and a piston carried by the other shaft disposed in the cylinder, means for rotating the shafts simultaneously, means for mounting a drill on one of the shafts, means for introducing fluid under pressure into said cylinder for moving one shaft with respect to the other to provide a feed traverse, and means for momentarily reciprocating said shafts reversely a distance sufficient to terminate the chips formed by the drill and as often as once approximately every one to three revolutions of the drill in its feed traverse.

10. A drill press having a head and a work table, a plurality of axially aligned shafts, means for moving said shafts longitudinally with respect to each other including a cylinder upon one shaft and a piston carried by the other shaft disposed in the cylinder, means for rotating the shafts simultaneously, means for mounting a drill on one of the shafts, means for introducing hydraulic fluid under pressure into said cylinder for moving one shaft with respect to the other, and means driven by one of said shafts for intermittently interrupting the supply of fluid under pressure to said cylinder and retracting said one of the shafts slightly once each revolution and including a flow interrupting valve and a flow metering device.

11. A drill press having a head and a work table, the combination of a plurality of axially aligned shafts journalled in the head, means for reciprocating said shafts with respect to each other including a cylinder upon one shaft and a piston carried by the other shaft disposed in the cylinder, means for rotating the shafts simultaneously, means for connecting a drill to one of the shafts, means for introducing fluid under pressure in said cylinder for moving one shaft with respect to a work piece, and means driven by one of said shafts for intermittently reversing the supply of fluid under pressure to said cylinder after the said one shaft has approached to within a predetermined distance of a work table to lift the drill once each approximate revolution approximately the thickness of the chip being formed.

12. A drill press having a head and a work table, the combination of a plurality of axially aligned shafts journalled in the head, means for reciprocating said shafts with respect to each other including a cylinder upon one shaft and a piston carried by the other shaft disposed in the cylinder, means for rotating the shafts simultaneously, means for connecting a drill to one of the shafts, means for introducing fluid under pressure in said cylinder for moving said one shaft with respect to a work piece, and means driven in stepped relationship with one of said shafts for intermittently reversing the supply of fluid under pressure to said cylinder once each approximate revolution after the said one shaft has approached to within a predetermined distance of a work table, and means for by-passing said driven means when said one shaft is moved away from the work table.

13. In a drill press having a head and a work table, the combination of a plurality of axially aligned elements, means for reciprocating said elements with respect to each other including a cylinder upon one element and a piston carried by the other element disposed in the cylinder, means for rotating one of the elements, means for connecting a drill to said one of the elements, means for introducing fluid under pressure in said cylinder for traversing said one element towards said work table, and means driven in stepped relationship with said one element for intermittently interrupting the supply of fluid under pressure to said cylinder and reversing momentarily said traverse.

14. In a power driven drill press having a head and a work support, the combination of a plurality of axially aligned elements, means for reciprocating said elements with respect to each other including a cylinder upon one element and a piston carried by the other element disposed in the cylinder, means for rotating one of the elements, means for connecting a drill to said one of the elements, means for introducing fluid under pressure in said cylinder for traversing said one element towards said work table at a rapid forward traverse, means driven in stepped relationship with said one element for traversing said one element at a feed traverse following said rapid forward traverse including a device intermittently interrupting the supply of fluid under pressure to said cylinder once each approximate revolution, and means for reverse traversing said one element each interruption a distance of approximately the thickness of the chip being formed by the drill.

15. In a device of the class described for machining a work piece, a housing, a drive member, a driven shaft, said driven shaft comprising two members journalled in the housing and movable axially with respect to each other, fluid pressure means for moving said two members axially with respect to each other in feed traversing direction including a hydraulic element, means upon one of said members for carrying a drill for drilling a work piece, and means for oscillating said one of the members and the drill carrying means with a reverse traverse once each approximate revolution which oscillation is accomplished within a minor portion of a revolution a distance enough to terminate the chip formed by a supported drill immediately prior thereto.

JOHN W. KARWEIT.

REFERENCES CITED

The following references are of record in the file of this patent:

UNITED STATES PATENTS

| Number | Name | Date |
|---|---|---|
| 1,911,132 | Macomber | May 23, 1933 |
| 1,759,412 | Noble | May 20, 1930 |
| 2,324,374 | Eden | July 13, 1943 |